Dec. 3, 1968  E. WILDHABER  3,413,896

PLANETARY MOTION MECHANISM

Filed May 22, 1967  4 Sheets-Sheet 1

INVENTOR:
Ernest Wildhaber

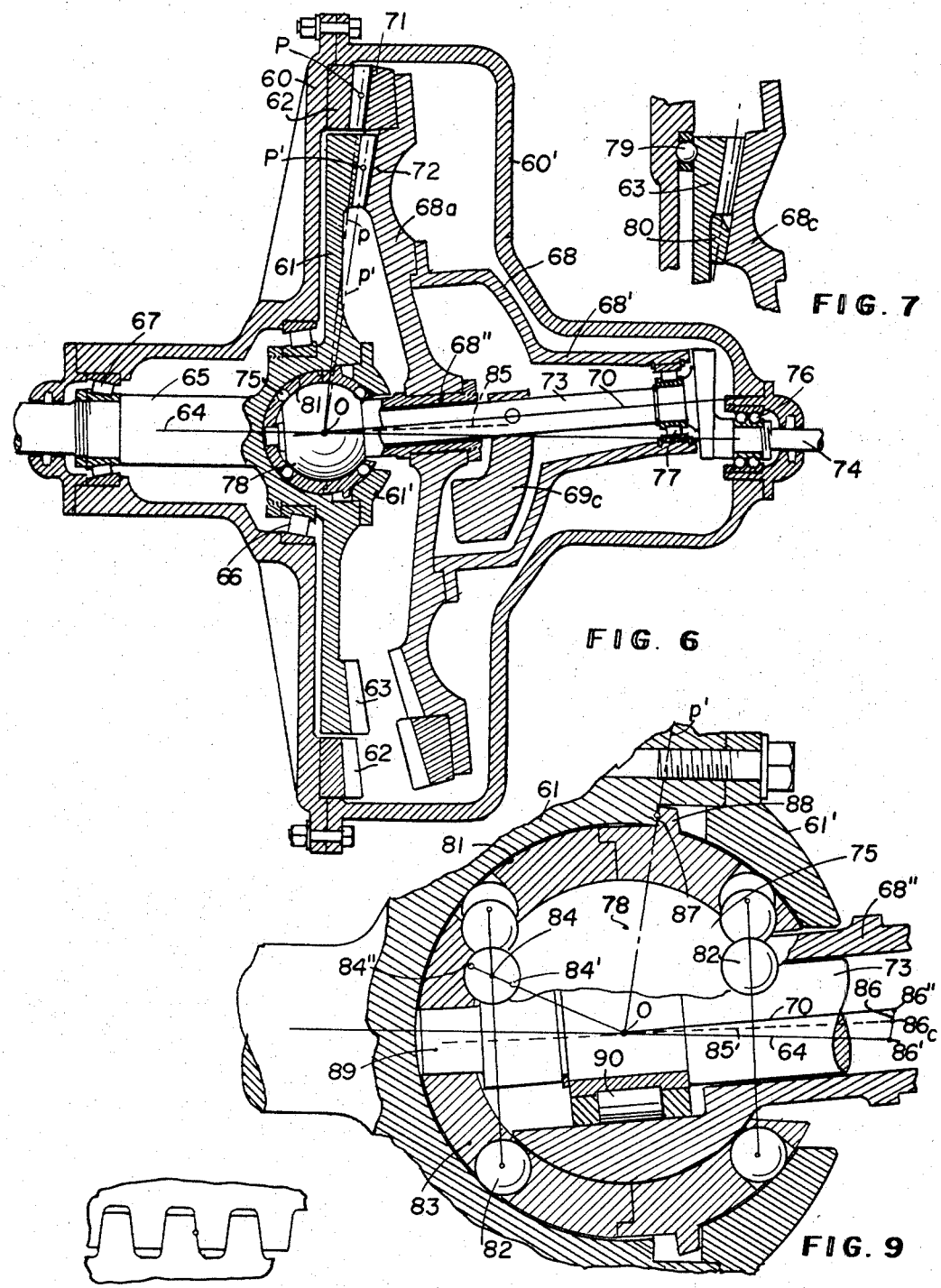

Dec. 3, 1968     E. WILDHABER     3,413,896
PLANETARY MOTION MECHANISM
Filed May 22, 1967     4 Sheets-Sheet 3

INVENTOR:
Ernest Wildhaber

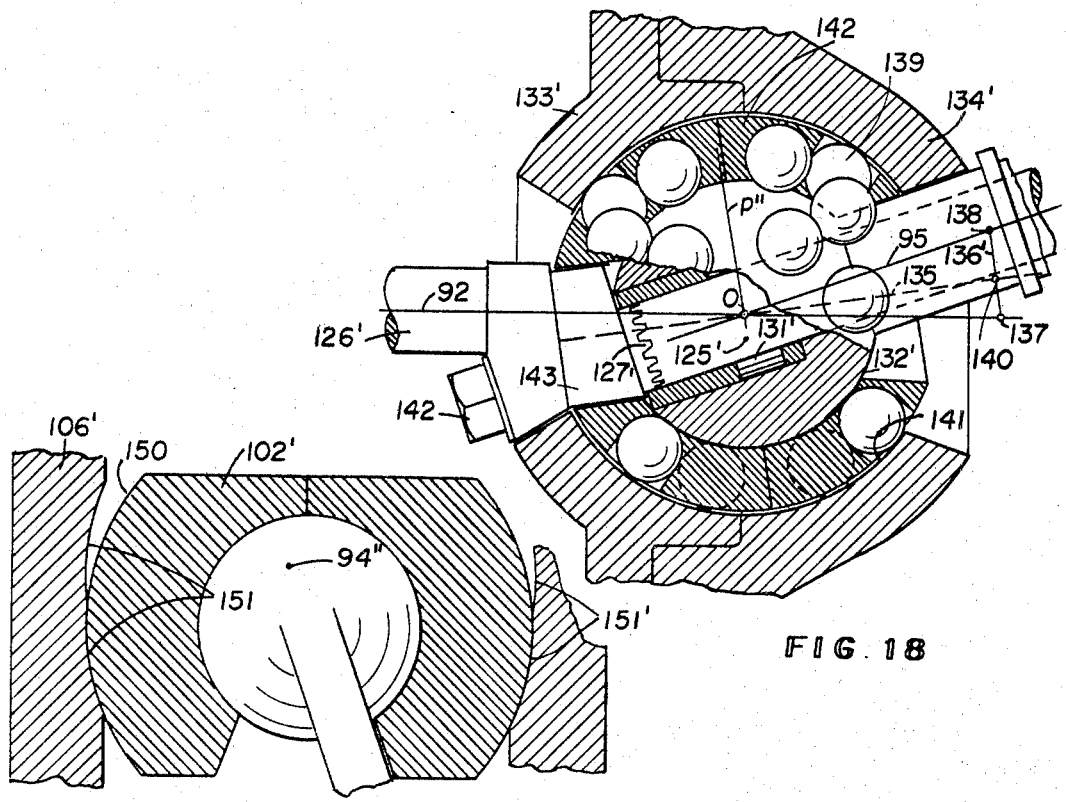
FIG. 18
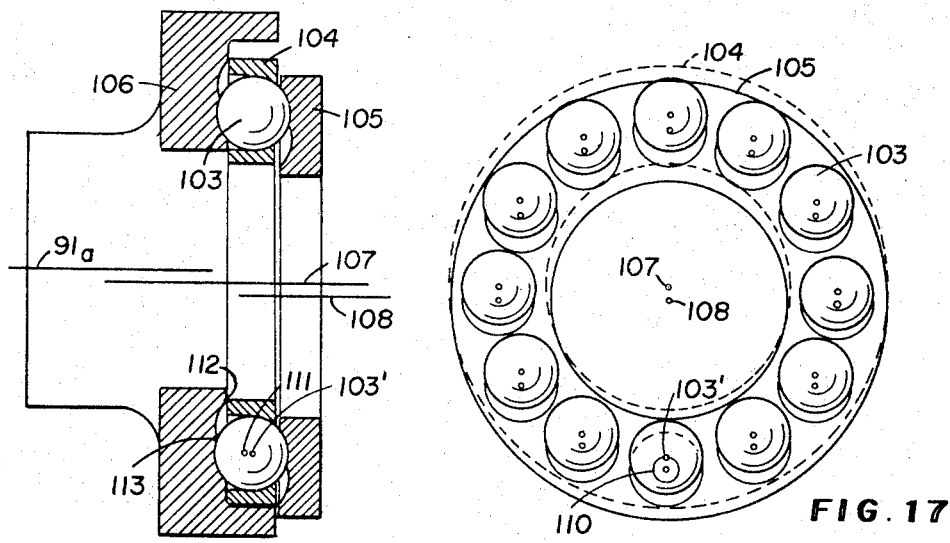
FIG. 19
FIG. 16
FIG. 17
INVENTOR:
Ernest Wildhaber

United States Patent Office 3,413,896
Patented Dec. 3, 1968

3,413,896
PLANETARY MOTION MECHANISM
Ernest Wildhaber, Brighton, N.Y.
(124 Summit Drive, Rochester, N.Y. 14620)
Filed May 22, 1967, Ser. No. 640,031
13 Claims. (Cl. 92—57)

ABSTRACT OF THE DISCLOSURE

A bearing is devised for direct rolling contact between parts that have a planetary relative motion, a relative motion obtainable by uniform rotation of two parts on different axes that lie in the same plane. The creation of such a planetary bearing leads to improved designs of certain types of planetary transmissions, and also of engines, compressors and pumps with reciprocating pistons that are connected to a planetary or wobble member. The planetary bearings contain balls generally kept in position by a cage. The cage is guided to describe an intermediate planetary motion to achieve rolling contact on all its balls, the cage center moving in a circular path.

---

The present invention relates to mechanisms containing two parts relatively movable in a plane or in a spherical surface not merely about an axis but with a planetary or compound motion.

A basic object is to effect direct rolling contact through balls between such parts and thereby to make possible new or improved mechanisms. The main objects are the improved mechanisms themselves.

After discovering the feasibility of direct rolling contact through balls between such parts, the invention establishes the requirements of such contact, so that the balls do not fight each other and do not fight the cage that keeps them in position.

Embodiments of the invention are illustrated in the drawings, in which

FIG. 6 is an axial section of a planetary bevel gearing embodying the invention.

FIG. 7 is a fragmentary axial section showing a modification thereof.

Figures 1, 2:
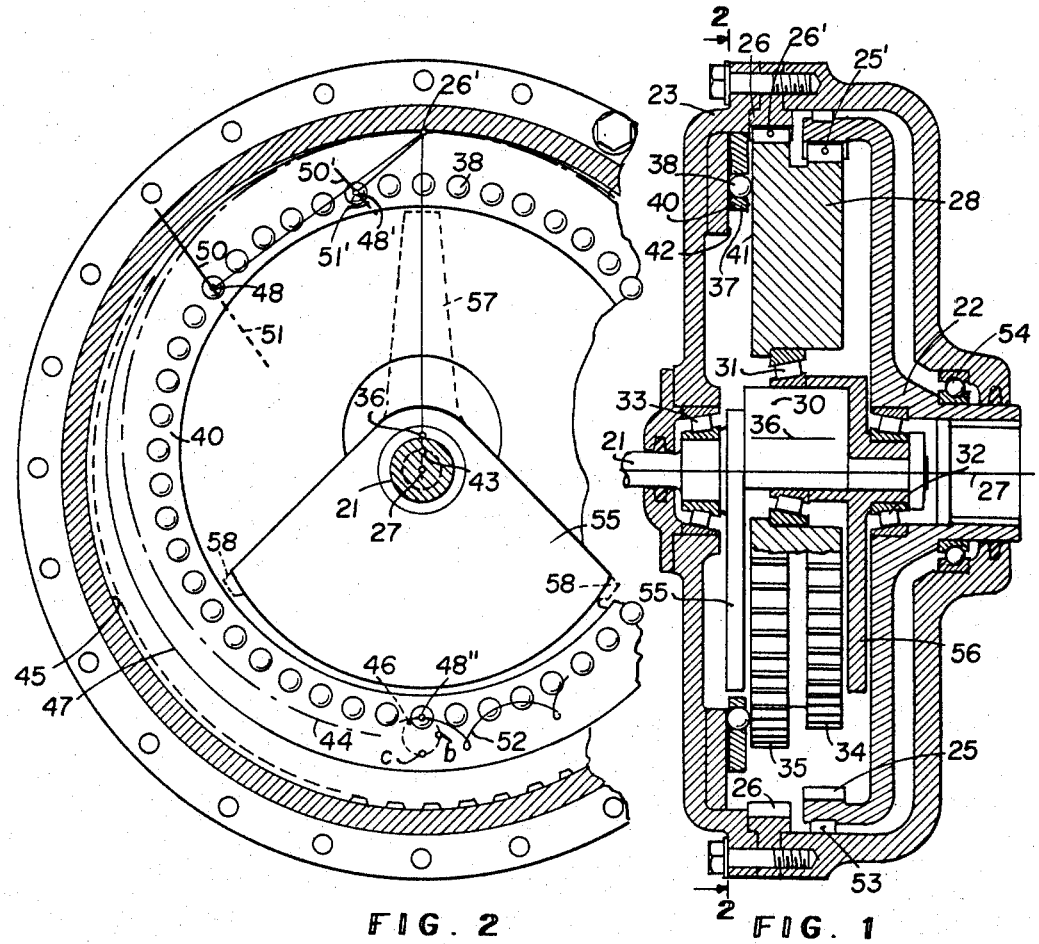
FIG. 1 is an axial section of a planetary spur-gear transmission embodying the invention.
FIG. 2 is a section taken along lines 2—2 of FIG. 1, looking in the direction of the arrows.

FIG. 8 is a fragmentary end view of the bevel teeth corresponding to FIGS. 6 and 7. Mating teeth almost match each other. Their difference is too small to show up in the drawing.

FIG. 9 is an axial section, at a larger scale, of the planetary antifriction bearing shown in FIG. 6.

Figure 10:
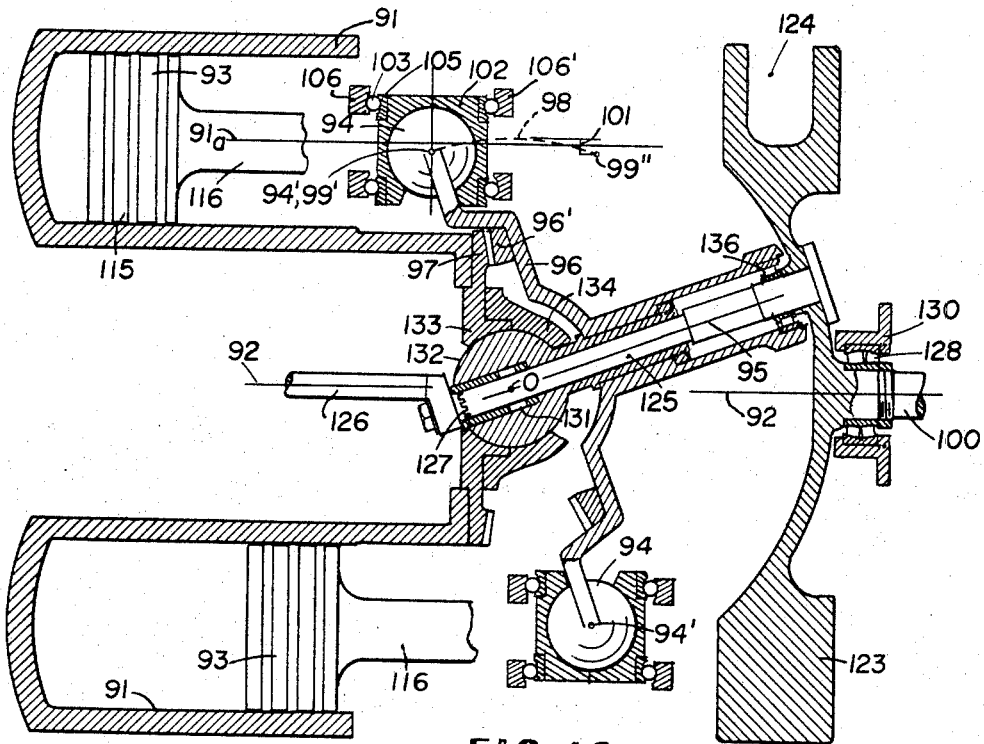

FIG. 10 is a diagrammatic axial section of an engine or displacement machine embodying the invention.

Figures 11, 12, 13:
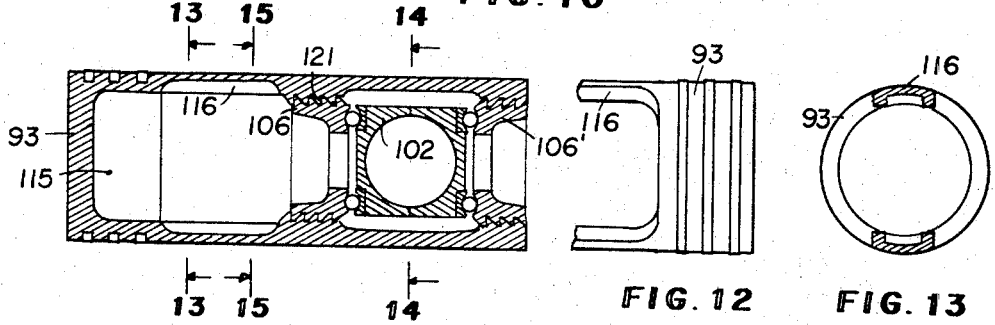

FIG. 11 is an axial section of a piston member thereof, taken at right angles to the drawing plane of FIG. 10.

FIG. 12 is a corresponding fragmentary side view of a piston. Together with FIG. 11 it also illustrates a piston adapted to act with both ends in coaxial cylinders.

Figure 15:
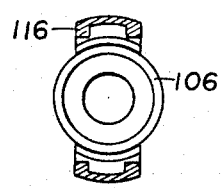
Figure 14:
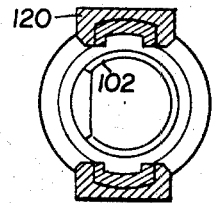

FIGS. 13, 14 and 15 are cross-sections taken along lines 13—13, 14—14 and 15—15 respectively of FIG. 11, looking in the direction of the arrows.

FIG. 16 is an enlarged axial section of the planetary antifriction bearing shown in FIG. 10.

FIG. 17 is a front view of ring 105 of FIG. 16 and of the balls, showing the individual circular raceways. The cage is outlined in dotted lines.

FIG. 18 is an axial section through an antifriction planetary bearing that might be used in place of the plain bearing centered at O in FIG. 10.

FIG. 19 is a sectional view of a modified connection between a ball end and its piston.

FIGS. 1 and 2 illustrate a planetary gearing suited for very large speed ratios. A 1000:1 ratio is feasible in one stage. It contains a high-speed shaft 21 and a low-speed element 22 coaxial therewith. Element 22 and a further element 23 are rigid with two coaxial internal gears 25, 26 respectively, whose axis 27 coincides with the axis of shaft 21. Element 23 with gear 26 is part of the stationary housing.

A planet 28 is rotatably mounted on eccentric portion 30 of shaft 21 by means of a bearing 31 and further means to be described. Shaft 21 itself is mounted on bearings 32, 33 in elements 22, 23. Two external gears 34, 35, disposed side by side, are rigid with planet 28. They mesh with the internal gears 25, 26 respectively.

Rotation of shaft 21 causes the planet to roll on stationary gear 26 of element 23 in a planetary motion. The planet also performs a planetary motion with respect to element 22.

The planet acts in each instant like a lever having a fixed pivot at pitch point 26′, moving the load at pitch point 25′ that has a small radial distance from point 26′. Because of the small difference in radius the tooth loads at 25′ and 26′ are very large; and they exert a tilting moment on the planet because of their axial distance. Ordinarily the tilting moment is taken up by a pair of bearings on the eccentric, but these would also be very highly loaded as they cannot be spread far apart without great inconvenience. These fast-running bearings cause high friction losses as compared with the transmitted energy.

The invention reduces these losses by providing a large planetary ball bearing 37 acting directly between the planet 28 and stationary element 23. Bearing 31 on the eccentric exerts axial pressure on the planet and keeps it in engagement with the planetary thrust bearing 37. A moderate load on bearing 37 balances the tilting moment because of the large bearing diameter. And its balls have only a small motion.

The balls 38 are held in a circular cage member 40 and act on the plane side 41 of planet 28 and on plane side 42 of an insert rigid with element 23. The cage 40 is eccentric of both axes 27, 36, its axis and center being at 43 (FIG. 2) between said axes. It performs a planetary motion with respect to element 23 and with respect to the planet.

The planet 28 and element 23 roll on each other so that pitch circle 44 of gear 35 rolls on the pitch circle 45 of stationary gear 26. Circle 45 coincides with the inside circle of element 23 appearing in FIG. 2. The two pitch circles 44, 45 contact at pitch point 26′ of the instantaneous axis of relative motion.

One requirement for true rolling contact is a cage motion that has the same instantaneous axis. The pitch circle of the cage here coincides with its outside circle 47. It contacts pitch circles 44, 45 at 26′.

Consider any position 48 of a ball center. The relative motion at this point of the cage is in a direction perpendicular to radius 26′–48 drawn from the instantaneous axis. Element 23 has a relative velocity that is the product of radius 26′–48 and the relative angular velocity between the cage and element 23. Vector 50 is a measure of this relative velocity. The planet has a relative velocity at point 48 that is the product of radius 26'–48 and the relative angular velocity between the cage and planet. Vector 51 is a measure thereof. It is in a direction opposite to vector 50. True rolling is achieved when the opposite vectors 50, 51 are equally large. This means that the relative angular velocities of the cage with respect to element 23 and with respect to planet 28 should be equal. This requirement determines the position of the cage center 43. If the radii to pitch point 26' from centers 27, 36 and 43 (FIG. 2) are called R, r and $R_c$ respectively, the above requirement can be expressed as $$\frac{1}{R_c} - \frac{1}{R} = \frac{1}{r} - \frac{1}{R_c}$$

hence $$\frac{2}{R_c} = \frac{1}{r} + \frac{1}{R}; \quad R_c = 26' - 43$$

This determines $R_c$ and the position of the cage center.

Similar conditions prevail at any other position 48' of the ball center. Here the opposite vectors 50', 51' are in a direction perpendicular to radius 26'–48' and are also equal. With the described disposition true rolling contact is achieved on all balls.

The motion of the ball centers is moderate. The cage turns very slowly as it orbits. If it would not turn at all, the ball centers would describe equal small circles, shown at 46 for ball center 48". After a quarter turn of shaft 21 the ball center would be in position b; after half a turn it would be in position c. The small turning motion of the cage displaces the ball center about the cage axis 43, so that it describes a curve 52. The cage rolls on the inside surface of element 23 and is kept in contact therewith by its centrifugal inertia force.

Element 22 with gear 25 is mounted in the transmission housing on large bearing 53 and bearing 54. A sector 55 integral with shaft 21 and another sector formed on a part 56 serve for counterbalance. If desired, the sector 55 may be extended to have an arm 57 and guide projections 58 for further keeping the cage 40 in proper position at all times.

Figures 3, 4, 5:
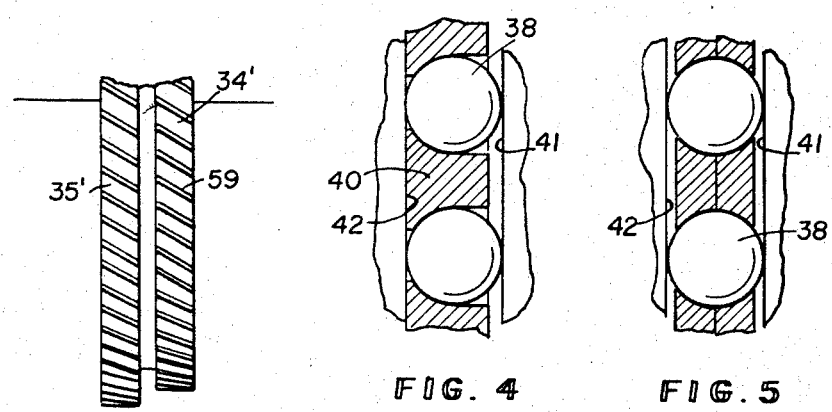
FIG. 3 is a fragmentary side view of the planet gears for the case when helical teeth replace the straight teeth shown in FIG. 1.
FIG. 4 is a fragmentary peripheral section of the cage member 40 used in the transmission or gearing shown in FIGS. 1 and 2, at a larger scale.
FIG. 5 is a similar section showing a modified form of cage member made up of two parts.

FIG. 3 illustrates a pair of planet gears 34', 35' that have helical teeth 59. The teeth of both gears have preferably the same hand and the same helix angle at the pitch radius.

The specific planetary motion above referred to is the relative motion of two parts that turn on parallel axes at a fixed ratio, which in the above example differs from one to one. An example of a one to one ratio will be described hereafter. This special case is known as a circular translation.

More broadly the planetary motion refered to is the relative motion of two parts that turn to a fixed ratio on different axes lying in a common plane. The relative motion is along a surface of revolution of constant profle in all normal sections, along a plane or along a spherical surface. It is either a plane motion or a spherical motion about an apex.

In the embodiment to be described with FIGS. 6 to 9 the two axes are inclined to each other and intersect, at O. It is a bevel planetary gearing, suited for very large speed ratios. It contains two elements 60, 61 rigid respectively with two coaxial bevel gears 62, 63 having a common axis 64. Element 60 is part of the housing 60' and is maintained stationary. Element 61 is here shown integral with gear 63 and with the low-speed shaft 65. It is rotatably mounted in element 60 on bearings 66, 67.

A built-up planet 68 is rotatable about an axis 70 intersecting axis 64 at apex O. It is rigid with two bevel gears 71, 72 that mesh with the gears 62, 63 respectively, so that gear 71 rolls on stationary gear 62 and performs a planetary motion. p, p' are the contact elements of the pitch surfaces of the two gear pairs; P, P' are the mean pitch points.

Shaft 74 is coaxial with gears 62, 63. It is rotatably mounted on bearing 76 in housnig 60' and at O inside of the planet.

The planet is built up of a part $68_a$ formed integral with gear 72, of part 68' that contains bearing 77, and of part 68" that contains ball end 78. The parts $68_a$, 68', 68" are rigidly secured together. Inside of planet part 68' is a counterweight $69_c$ secured to portion 73 of shaft 74.

FIG. 7 illustrates a modified way of mounting element 61 by means of a large conventional type thrust bearing 79. The design may then be shortened by omitting bearing 67 and reversing the taper of bearing 66. A ring 80 secured to gear 63 may bear against planet $68_c$.

The planetary bearing 75 journals the planet 68 on the inside spherical surface 81 of element 61 and of cover 61'.

The planet with ball end 78 and element 61 have an axis p' of instantaneous relative motion (FIG. 9). They bear on one another through balls 82 maintained in position by a cage 83 made up of two parts rigid with each other. Let us consider the ball with center 84. It contacts the spherical race surfaces 78, 81 at points 84', 84" of radius O–84.

A first requirement for rolling contact on all balls: the cage motion should have the above defined instantaneous axis p'. Element 61 and the planet 68 then move relatively to cage point 84 and radius O–84 about the instantaneous axis p' in a direction perpendicular to the plane containing axis p' and radius O–84. The relative velocity at contact point 84' is the product of the distance of point 84' from instantaneous axis p' and of the relative angular velocity w' between the cage and the planet. The relative velocity at contact point 84" is the product of the distance of point 84" from instantaneous axis p' and of the relative angular vecocity w" between the cage and element 61. The said distances are proportional to the radii $r_i = $O$–84'$ and $r_o = $O$–84"$ respectively. Equal and opposite velocities at contact points 84', 84" provide true rolling contact and require the following relation:

$$w' \cdot r_i = w'' \cdot r_o$$

The thereby required position of the cage axis 85 may be obtained by the following geometric construction. Draw (FIG. 9) a line 86 parallel to the instantaneous axis p'. It intersects axes 64 and 70 at points 86' and 86" respectively. Obtain point $86_c$ that intersects distance 86'–86" in the proportion $$\frac{86_c - 86'}{86_c - 86''} = \frac{r_i}{r_o}$$

to obtain the cage axis $85 = $O$–86_c$. The above relationship can also be computed. The cage axis lies in the plane of the axes 64, 70.

With the cage position so determined, all balls held in the cage will truly roll.

Element 61 may contain a circular recess with a plane side 87 that passes through a point of instantaneous axis p', for a circular flange 88 of cage 83 to roll on. It thereby maintains the required angular position of the cage axis. For further definition of this position, the part 73 of the high-speed shaft contains a cylindrical projection 89 coaxial with the cage axis 85. It engages a bore provided in the cage and thereby keeps the cage in the required position at all time. It does so even when no flange 88 is provided, which however takes up most of the guiding load with rolling contact.

Part 73 of the high-speed shaft 74 is journalled at O in ball head 78 by means of a roller bearing 90.

RECIPROCATORY ENGINE

The planetary bearing principle also leads to improve designs of positive-displacement machines, such as engines, pumps, compressors, that contain a plurality of parallel cylinders 91 (FIG. 10) provided in the frame of the machine and arranged about a machine axis 92. These cylinders are engaged by reciprocatory pistons 93, whose design is particularly improved.

A conventional piston has a pin in its forward hot part for rockably attaching the connecting rod. The attachment presents lubrication difficulties and also exerts considerable side load on the piston, to be taken up at the hot cylinder walls. The engine or machine to be described has no moving parts in the hot region of the pistons, and almost no side load is exerted on the piston. The pressure is transmitted nearly in line with the cylinder.

The pistons 93 are attached to ball ends 94 spaced about the axis 95 of a holder 96. The holder is a planet member also known as a wobble member. Its axis 95 is inclined to and intersects the machine axis 92 at apex O. The holder is rigid with a bevel gear 96′ that meshes at a one to one ratio with a bevel gear 97 secured to the machine frame.

In operation the center 94′ of each ball end 94 moves back and forth between end positions 99′, 99″ on a sphere 98 centered at apex O, shaft 100 being coaxial with the machine axis 92. The ball ends are preferably so positioned that the cylinder axis 91$_a$ is midway between the top of sphere 98 and the end positions 99′, 99″. In a view along the cylinder axis the path of ball center 94′ is a small circle then centered on the cylinder axis and having a diameter 101. And this is also its relative path with respect to the piston and its extension.

The ball end 94 transmits its motion to a pair of ball cups 102 secured together and maintained in a fixed angular position. They perform a special kind of planetary motion with respect to the piston, a circular translation, the relative motion existing between two parts that are equally rotated in the same direction about parallel axes. There is no relative turning motion between the two parts. Pressure between the ball cups 102 and their piston 93 is transmitted through balls 103 held in a circular cage 104, see also FIGS. 16 and 17. The balls contact a race ring 105 secured to a ball cup 102, and on the opposite side contact a part 106 secured to the extended piston 93. True rolling occurs when the axis 107 of cage 104 is midway between the cylinder axis 91$_a$ and the axis 108 parallel thereto and passing through ball-end center 94′. The center 103′ of each ball 103 describes a circle 110 (FIG. 17) with respect to race ring 105 and an equal circle with respect to part 106. The last-named two circles have diameters one half the diameter 101.

Because each ball 103 moves around in a small circle, the race surfaces do not need to be planes, but can be individual circular races of concave profile. Each ball then has its own pair of circular races. The race profile may be a circular arc centered at the ball center. Or it may be a circular arc of somewhat larger radius, centered at 111 (FIG. 16) for ring 105. This increases the load capacity. As the individual race circles are small, the outer profile end 112 stands out further from the bottom of the race track than the central portion 113. It is closer to the plane of the ball centers than central portion 113.

The provision of individual circular races for each ball also keeps ring 105, and the cup 102 connected with it, angularly stationary through the action of the balls, so that it does not turn.

Piston 93 has a head 115 from which two arms 116 reach towards the planet member or holder 96, see also FIGS. 11, 13 to 15. Guide rails 120 (FIG. 14) may be used. The parts 106 have two diametrically opposite projections containing circular threads 121. These engage mating internal threads provided on projections of the arms 116. The parts 106, 106′ are secured against rotation and are rigid with the piston. The load transmitted through parts 106 is mainly in the direction of the cylinder axis 91$_a$, in one direction on part 106; in the opposite direction on part 106′. The threads 121 have a negative profile inclination on the load side, so that the load tends to press the arms 116 towards the parts 106, 106′.

While FIG. 10 shows pistons acting on one end only, FIG. 12 together with FIG. 11 illustrate a double-acting piston, whose opposite ends engage opposite coaxial cylinders.

Uneven or even numbers of cylinders may be used.

The machine shaft 100 is rigid with a flywheel 123 that has a recess 124 for mass balance. It is also rigid with further mass-balance means located adjacent the closed ends of the cylinders 91 and not shown. An inclined shaft portion 125 coaxial with the planetary holder 96 is rigidly secured to shaft 100. A continuation 126 thereof is secured to the end of shaft portion 125 by means of a toothed face coupling 127. The machine shaft 100 is journalled on bearing 128 in a stationary portion 130, and at O inside of the planet member 96 by a roller bearing 131.

Member 96 contains a ball head 132 rigid with it and centered at apex O. Head 132 is slidably mounted in cup portions 133, 134 rigid with the machine frame. Member 96 is further journalled on bearing 136 held by the machine shaft assembly.

Conventional timing means are used, but not shown. They are operated through shaft portion 126.

The ball head 132 performs a planetary motion at a one to one ratio with respect to the cup portions 133, 134. FIG. 18 illustrates a planetary antifriction bearing for a ball head 132′, as a substitute for the described sliding bearing. It contains a plurality of balls 139 arranged in two pairs of rows and contacting the convex ball-head surface and a concave spherical surface 141 provided on stationary cup portions 133′, 134′. The balls are maintained in position by a circular cage member 142 with axis 135. Member 142 is made up of two halves rigidly secured together.

The cage axis 135 should lie in the plane of the axes 92, 95. Its inclination may be determined by drawing a line 136′ parallel to the axis $p″$ of instantaneous relative motion between the gears 96′, 97. Because of the one to one ratio, axis $p″$ bisects the angle between the axes 92, 95. Line 136′ intersects the axes 92, 95 at points 137, 138. The cage axis 135 should pass through point 140 which divides distance 137–138 at the ratio of the radii $r_i$, $r_o$ of the convex ball-head surface and the concave spherical surface 141.

$$\frac{137-140}{138-140} = \frac{r_i}{r_o}$$

The one to one ratio causes each ball center to describe a looped closed curve with respect to head 132′ and a similar one with respect to cup portions 133′, 134′. This curve is here in the form of a flattened figure 8. It is known as a lemniscate. If desired, a pair of opposite race tracks of concave cross-section may be provided for each ball 139 on head 132′ and on the cup portions 133′, 134′ respectively. The race tracks extend along said looped closed curves and increase the load capacity.

The extension 126′ of the machine shaft is secured to the inclined portion 125′ by a toothed face coupling 127′ held in engagement by a threaded bolt 142. The extension 126′ also contains a cylindrical portion 143 that is coaxial with the cage axis 135. It engages a bore of the cage and maintains the cage in proper position. A roller bearing 131′ helps to mount the machine shaft, as described.

The ball ends 94 (FIG. 10) perform a like planetary motion with respect to their cups 102. A planetary antifriction bearing generally like that of FIG. 18 may be substituted for the plain bearing shown.

FIG. 18 illustrates a cheaper and less refined connection between a ball end 94″ and the piston. Here the cup-halves 102′ have a spherical outside surface 150 that rolls on a circular raceway 151 of a part 106′ rigid with the piston, or on an opposite circular raceway 151′, depending on the direction of pressure. The profile of raceways 151, 151', in cross-section, is a concave circular arc that nearly fits the outside surface 150.

As described, the design-influencing planetary bearings of the invention use balls as rolling members. The balls move to and from different positions along different paths. In FIG. 2 the ball center 48'' may move directly to the outside end of the next loop. But it does not move back the same way. Its path goes on and on as the planetary motion continues in the same direction, and it takes many loops before it returns to position 48''. When the planetary motion is at a one to one ratio, the path described by the ball center is a closed curve repeated at each cycle. There is no back and forth reciprocation or oscillation in the same path.

While the invention has been described with several embodiments thereof, further modifications may be made without departing from its spirit. For definition of its scope it is relied on the appended claims.

I claim:
1. A mechanism containing two parts relatively movable in a planetary motion, and antifriction bearing means operating directly between said two parts, said bearing means containing at least one ball member whose ball center is movable in a surface of revolution of constant profile in all normal sections, such as a plane, a sphere, and means for moving said ball center to and from different positions in said surface along different paths while the motion of the mechanism continues in the same direction.

2. A mechanism according to claim 1, wherein the bearing means engaging said parts contain a plurality of balls and a planetary cage member for maintaining said balls in position.

3. A mechanism according to claim 2, wherein the cage member is circular, and wherein means are provided to keep the centers of said balls in a fixed plane and to guide the cage member in a circular path in said plane.

4. A mechanism according to claim 3, wherein the planetary relative motion of said two parts is a circular translation, each ball of the bearing means describing its own circular path with respect to each of said two parts, a pair of circular race surfaces are provided for each ball, said race surfaces having a concavely curved profile in cross-section.

5. A mechanism according to claim 2, wherein the planetary motion is about an apex, the balls contact and roll on a convex and a concave smooth spherical surface provided on the respective parts and centered at said apex, the cage member is guided so that its center describes an eccentric circular path with respect to each of said two parts.

6. Planetary gearing comprising two elements, two coaxial gears rigid respectively with said elements, means for maintaining one of said elements stationary, the other element being the low-speed member, a rotary high-speed member coaxial with said gears, a planet carried by said high-speed member, said planet being rotatable about an axis lying in a plane that contains the axis of said gears, two gears rigid with said planet and meshing respectively with the gears of said elements, bearing means operating directly between the planet and one of said elements, said bearing means containing a plurality of balls, race surfaces provided on the planet and said one element for the balls to roll on, and a planetary cage member for maintaining the balls in position.

7. Planetary gearing according to claim 6, wherein the axis of the planet is parallel to and offset from the axis of said elements, the gears of said elements are internal gears, and the gears rigid with the planet are external gears arranged side by side.

8. Planetary gearing according to claim 7, wherein the race surfaces are planes perpendicular to the axis of said elements, a circular cage member is provided and means for guiding said cage member so that its center describes a circular path.

9. Planetary gearing according to claim 6, wherein the axis of the planet is at an angle to and intersects the axis of said elements at an apex, the race surfaces are spherical surfaces centered at said apex, the cage member has an axis passing through said apex and being inclined to the axis of said elements at a smaller angle than the axis of the planet.

10. A positive-displacement machine having a plurality of parallel cylinders provided in the frame of the machine and arranged about the machine axis, pistons reciprocable in said cylinders, a holder connected to said pistons through a plurality of ball surfaces provided thereon and spaced about the axis of said holder, said holder axis being inclined to and intersecting said machine axis at an apex, means for constraining said holder to roll on a portion rigid with said frame in a planetary motion at a one to one ratio, whereby the center of each ball surface describes a circular path with respect to the piston connected therewith, a rocking part movable about said center on each of said ball surfaces, and means for effecting rolling contact between said rocking part and the piston connected therewith.

11. A positive-displacement machine according to claim 10, wherein said rocking part and its piston are connected by a plurality of balls held in a cage, each ball thereof engaging its own circular raceway rigid with said rocking part and an opposite circular raceway rigid with the piston, so that there are as many pairs of raceways as there are balls.

12. A positive-displacement machine according to claim 11, wherein the ball centers are disposed and move in a plane perpendicular to the machine axis, and the circular raceways reach closer to said plane at their outside circle than at their center.

13. A mechanism according to claim 2, wherein the planetary motion is the relative motion of two parts moved at a one to one ratio respectively about two axes lying in the same plane, a pair of opposite race tracks are provided for each of said balls, said race tracks extending along looped closed curves, such as circles, figure eight curves.

References Cited
UNITED STATES PATENTS

| | | | |
|---|---|---|---|
| 1,244,668 | 10/1917 | Whaley | 92—57 |
| 1,307,480 | 6/1919 | Brackett | 92—57 |
| 1,770,016 | 7/1930 | Ruliancich | 74—804 |
| 3,052,138 | 9/1962 | Louton et al. | 74—805 |
| 3,056,315 | 10/1962 | Mros | 74—805 |
| 3,187,644 | 6/1965 | Ricketts | 92—57 X |

ARTHUR T. McKEON, *Primary Examiner.*